Patented Dec. 1, 1942

2,303,842

UNITED STATES PATENT OFFICE 2,303,842

PROCESS FOR PRODUCING UNSATURATED ALIPHATIC COMPOUNDS

Philip M. Kirk, Stamford, and Louis C. Jones, Greenwich, Conn., assignors to American Cyanamid Company, New York, N. Y., a corporation of Maine No Drawing. Application April 12, 1941, Serial No. 388,265

19 Claims. (Cl. 260—486)

The present invention relates to the production of unsaturated aliphatic compounds from hydroxy aliphatic compounds. More particularly the present invention relates to the treatment of hydroxy aliphatic compounds with metal chlorosulfonates under conditions which will result in removal of the hydroxy group and introduce instead thereof a double bond; and produce at the same time hydrogen chloride and a metallic acid sulfate as by-products.

In accordance with the present invention aliphatic hydroxy compounds are reacted with a metal chlorosulfonate, hydrogen chloride is liberated and the reaction product is subjected to a heating or pyrolysis treatment at a temperature which causes the hydroxy aliphatic compound to undergo a change resulting in the removal of the hydroxy group and the formation of a double bond. The unsaturated aliphatic compound is volatilized at the temperature employed and is recovered by condensation leaving behind a residue of a metallic acid sulfate.

In carrying out the process metal chlorosulfonates generally are suitable, including those such as the alkali metal and ammonium chlorosulfonates, the alkaline earth metal chlorosulfonates, as well as other metal chlorosulfonates. These metal chlorosulfonates are produced by reacting metal chlorides with sulfur trioxide. For example, when sodium chloride is reacted with sulfur trioxide at a temperature of 75 or 80° C. sodium chlorosulfonate is produced together with possibly a small amount of sodium pyrochlorosulfonate. Sodium chlorosulfonate is the reagent which we prefer to use in carrying out the present invention because of its cheapness and availability. However, as pointed out heretofore we may use other metal chlorosulfonates such as potassium chlorosulfonate, ammonium chlorosulfonate, calcium chlorosulfonate, lithium chlorosulfonate, strontium chlorosulfonate, magnesium chlorosulfonate, and the like.

The process of the present invention may be employed for introducing a double bond into aliphatic hydroxy carboxylic acids, such as for example alpha-hydroxyisobutyric acid, alpha-hydroxypropionic, alpha-hydroxybutyric, alpha-hydroxy n- and iso-valeric, beta-hydroxybutyric, beta - hydroxyisobutyric, beta - hydroxyvaleric, beta-hydroxyisovaleric, as well as the higher aliphatic hydroxy acids.

The process is also applicable to esters of aliphatic hydroxy carboxylic acids including esters of aliphatic alcohols, cycloaliphatic alcohols, aromatic alcohols, and heterocylic alcohols. Suitable esters are the methyl, ethyl, propyl, butyryl, dodecyl, octadecyl, alpha-naphthyl methyl, benzyl, tetra-hydrofurfuryl, cyclohexyl or other esters of the various acids listed above and particularly such esters of alpha-hydroxyisobutyric acid and alpha-hydroxypropionic acid.

Aliphatic hydroxy alcohols are converted into olefins or unsaturated compounds by our process. These alcohols may be monohydroxy alcohols, such as for example, secondary butyl alcohol, amyl alcohol, pentanol-3, pentanol-2, hexyl alcohols such as hexanol-1, hexanol-3, heptyl alcohols such as n-heptyl alcohol, di-isopropyl carbinol, octyl alcohols such as octanol-1, octanol-2, dodecyl, hexadecyl, octadecyl or other higher alcohols. The various polyhydric alcohols, such as trimethylene glycol, alpha-butylene glycol, 1,3-butane diol, methylpropane diol, and the like, may also be used.

The general method for carrying out the process of our invention comprises reacting a metal chlorosulfonate such as for example sodium chlorosulfonate with one of the hydroxy aliphatic compounds listed above, such as for example alpha-hydroxyisobutyric acid, at a moderate temperature usually about 25° and less than 100° C., and then subjecting the reaction mixture to a temperature high enough to cause sodium acid sulfate to be split out of the reaction product. The heat tretament is carried out at temperatures ranging from about 100° C. up to about 250° C. and in some instances may even approach 400° C. In most cases the reaction between the metal chlorosulfonate and the hydroxy compound may be carried out by simply mixing at room temperature. In some instances it may be desirable to carry out the reaction at a slightly higher temperature and in some instances it may be desirable to carry out the reaction at a considerably lower temperature, particularly where there is a violent reaction. Similarly the reaction may be carried out in an inert media as a diluent. The temperature at which this reaction mixture is heated to produce the unsaturated compound will vary depending upon the aliphatic hydroxy compound employed and as pointed out above normally is between 100 and 400° C. Generally speaking, however, this temperature will be close to or slightly higher than the boiling point or distillation temperature of the unsaturated compound and most frequently is above 100° C. It is readily seen, therefore, that the distillation temperature for the unsaturated derivatives from the short chain aliphatic hydroxy alcohols would be much less than those of the long chain aliphatic hydyroxy alcohols. Similarly the unsaturated esters of the low molecular weight alcohols are recovered at a lower temperature than the unsaturated esters of the higher molecular weight alcohol esters, for example, the unsaturated derivative of methyl lactate distills at a temperature of about 80° C. whereas the tetra-hydrofurfuryl lactate distills at a temperature of from 122 to 125° C.

The hydrogen chloride gas liberated in the reaction between the metal chlorosulfonate and the hydroxy aliphatic compound may be recovered by absorbing the gas in aqueous medium to produce hydrochloric acid. If desired, the hydrogen chloride may be utilized for the production of chlorides by passing the hydrogen chloride gas through an aqueous solution of or suspension of an alkali or alkaline earth metal hydroxide. Similarly, the hydrogen chloride gas may be used for the production of hydrochlorides of organic bases or for carrying out other reactions which ordinarily are carried out using HCl.

The solid residue remaining after the distillation of the unsaturated aliphatic compound consists primarily of the metal acid sulfate; for example, when sodium chlorosulfonate is employed the residue is sodium acid sulfate. The sodium acid sulfate is a valuable product and in operations wherein crude sodium acid sulfate may be employed, the residue may in some cases be used without further purification. In general, however, we prefer to extract the crude residue with water and remove insoluble decomposition products by filtration or otherwise after which sodium acid sulfate in a relatively pure state may be recovered from the solution. The recovery of the hydrogen chloride gas and the sodium acid sulfate produced as by-products in our process offer important economic advantages.

Many of the unsaturated compounds produced by our process are polymerizable materials and in some instances it may be desirable to carry the process out in the presence of polymerization inhibitors. Suitable inhibitors include substances such as sulfur, hydroquinone, copper bronze, tannic acid, resorcinol and the anhydrous metal halides described and claimed in the U. S. Patent 2,143,941.

The invention will be illustrated in more detail by the following specific examples. It should be understood, however, that the examples are for the purpose of illustration and the invention is not to be limited by the details set forth therein. The parts are by weight.

*Example 1*

118 parts of the methyl ester of alpha-hydroxyisobutyric acid were slowly added with stirring to 140 parts of pulverized sodium chlorosulfonate during about one-half hour at a temperature of from 24° to 35° C. Hydrogen chloride was evolved and a paste-like mass was formed. The hydrogen chloride was collected by absorbing in water. The mixture was subjected to distillation at a temperature of from about 100 to 130° C. The distillation product was purified by fractionation and was found to represent a yield of about 64% of pure methyl methacrylate and about 14% of the polymer of methyl methacrylate. The distillation residue was extracted with hot water and after filtration and evaporation a good yield of sodium acid sulfate was obtained.

*Example 2*

118 parts of methyl alpha-hydroxyisobutyrate were added with stirring to a mixture of 150 parts of sodium chlorosulfonate and 200 parts of an inert high boiling naphtha, during about 10 minutes at a temperature of about 25° C. The mixture was then heated to a temperature of about 80-90° C. for 1½ hours. The mixture was then subjected to distillation at reduced pressure and methyl methacrylate was obtained in about 80% yield.

*Example 3*

Two moles each of methyl alpha-hydroxyisobutyrate and sodium chlorosulfonate were mixed at a temperature of about 25° C. and stirred without heating for ten minutes. The mixture was then subjected to distillation at a temperature starting at about 100° C. up to about 130° C. and the distillate collected in a vessel containing about two drops of p-butylamino phenol. The yield of methyl methacrylate was about 85% and the p-butylamino phenol was an efficient inhibitor in preventing polymerization during distillation and purification.

*Example 4*

Alpha-hydroxyisobutyric acid was treated in a manner similar to that described in Example 1, resulting in the production of methacrylic acid.

*Example 5*

Lactic acid was reacted with sodium chlorosulfonate and treated in a manner similar to that described in Example 1. Acrylic acid was readily obtained.

*Example 6*

Capryl alcohol was reacted with sodium chlorosulfonate and treated in a manner similar to that described in Example 1. An unsaturated compound which is probably octene-1 was obtained.

*Example 7*

Methyl lactate was treated in a manner similar to that described in Example 1 and a mixture of polymerized and unpolymerized methyl acrylate was obtained.

*Example 8*

The ethyl ester of alpha-hydroxyisobutyric acid was treated in a manner similar to that described in Example 1 and ethyl methacrylate was obtained.

*Example 9*

Ethyl beta-hydroxypropionate was treated in a manner similar to that described in Example 1 and an unsaturated product was obtained which was found to be ethyl acrylate.

*Example 10*

Ethyl beta-hydroxyisobutyrate was treated as described in Example 1 and an unsaturated compound resembling crotonate was obtained.

In the foregoing examples the sodium chlorosulfonate may be replaced either in part or entirely by other metal chlorosulfonates and similar results be obtained. Likewise various other hydroxy aliphatic compounds may be substituted for those of the examples including aliphatic hydroxy compounds having a plurality of hydroxy groups, for example, 1,3-butylene glycol or aliphatic hydroxy compounds already having an unsaturated linkage, for example hydroxy-beta-ethylidine propionate in which case one carbalkoxy butane diene-1,3 is produced or various other hydroxy compounds which react similarly under the same or slightly modified conditions may be employed, such as for example, amino alcohols, nitro alcohols, halogenated alcohols, and the like.

We claim:

1. The process which comprises reacting a metal chlorosulfonate with a hydroxy aliphatic compound of the group consisting of aliphatic alcohols, hydroxyaliphatic acids, and hydroxy aliphatic acid esters and heating the reaction mixture to produce an unsaturated aliphatic compound.

2. The process which comprises reacting a hydroxy carboxylic aliphatic acid ester with a metal chlorosulfonate and heating the reaction mixture to produce an unsaturated carboxylic acid ester.

3. The process which comprises reacting a hydroxy carboxylic aliphatic acid with a metal chlorosulfonate and heating the reaction mixture to produce an unsaturated aliphatic carboxylic acid.

4. The process which comprises reacting an aliphatic alcohol with a metal chlorosulfonate and heating the reaction mixture to produce an unsaturated aliphatic compound.

5. The process which comprises reacting a hydroxy aliphatic compound of the group consisting of aliphatic alcohols, hydroxyaliphatic acids, and hydroxy aliphatic acid esters with sodium chlorosulfonate and heating the reaction mixture to produce an unsaturated aliphatic compound.

6. The process which comprises reacting an aliphatic hydroxy carboxylic acid ester with sodium chlorosulfonate and heating the reaction mixture to produce an unsaturated aliphatic carboxylic acid ester.

7. The process which comprises reacting an aliphatic hydroxy carboxylic acid with sodium chlorosulfonate and heating the reaction mixture to produce an unsaturated aliphatic carboxylic acid.

8. The process which comprises reacting an aliphatic alcohol with sodium chlorosulfonate and heating the reaction mixture to produce an unsaturated aliphatic compound.

9. The process which comprises the steps of reacting a metal chlorosulfonate with a hydroxy aliphatic compound of the group consisting of aliphatic alcohols, hydroxyaliphatic acids, and hydroxy aliphatic acid esters, recovering the hydrogen chloride gas liberated by the reaction, heating the reaction mixture, recovering an unsaturated aliphatic compound produced by the heating and leaving a residue of the metal acid sulfate.

10. A method of producing an unsaturated aliphatic compound, hydrogen chloride, and sodium acid sulfate, which comprises reacting sodium chlorosulfonate with a hydroxy aliphatic compound of the group consisting of aliphatic alcohols, hydroxyaliphatic acids, and hydroxy aliphatic acid esters, recovering the hydrogen chloride gas liberated by the reaction, heating the reaction mixture, recovering an unsaturated aliphatic compound produced by the heating and leaving a residue of sodium acid sulfate.

11. A method of producing methyl methacrylate, hydrogen chloride and sodium acid sulfate which comprises reacting sodium chlorosulfonate with the methyl ester of alpha-hydroxyisobutyric acid, recovering the hydrogen chloride gas liberated by the reaction, heating the reaction mixture, recovering methyl methacrylate and leaving a residue of sodium acid sulfate.

12. The process of producing methyl methacrylate which comprises reacting the methyl ester of alpha-hydroxyisobutyric acid with a metal chlorosulfonate at a temperature below 100° C. and then heating the reaction mixture at a temperature above 100° C. to produce methyl methacrylate.

13. The process of producing methyl methacrylate which comprises reacting the methyl ester of alpha-hydroxyisobutyric acid with sodium chlorosulfonate at a temperature below 100° C. and then heating the reaction mixture at a temperature of from about 100° C. to about 130° C. to produce methyl methacrylate.

14. The process for producing methacrylate acid which comprises reacting alpha-hydroxyisobutyric acid with a metal chlorosulfonate at a temperature below 100° C. and then heating the mixture to a temperature above 100° C.

15. The process for producing methacrylate acid which comprises reacting alpha-hydroxyisobutyric acid with sodium chlorosulfonate at a temperature below 100° C. and then heating the mixture to a temperature above 100° C.

16. The process for producing an olefin which comprises reacting capryl alcohol with a metal chlorosulfonate at a temperature below 100° C. and then heating the reaction mixture to a temperature above 100° C. to produce an olefin.

17. A process according to claim 1 in which the reaction is carried out in an inert diluent.

18. A process according to claim 1 in which the reaction is carried out in the presence of an organic basic liquid.

19. A process according to claim 1 in which the reaction is carried out in the presence of a polymerization inhibitor.

PHILIP M. KIRK.
LOUIS C. JONES.